United States Patent
Plöckl

(10) Patent No.: US 12,547,868 B2
(45) Date of Patent: Feb. 10, 2026

(54) FIXABLE LABELLING MEDIUM, METHOD FOR MANUFACTURING THE FIXABLE LABELLING MEDIUM, USE OF THE FIXABLE LABELLING MEDIUM AND SYSTEM CONSISTING OF A CASTING DEVICE/PATCH DEVICE AND THE FIXABLE LABELLING MEDIUM

(71) Applicant: PMG BESITZ GMBH & CO. KG, Pfaffenhofen (DE)

(72) Inventor: Roman Plöckl, Pfaffenhofen (DE)

(73) Assignee: PMG BESITZ GMBH & CO. KG, Pfaffenhofen (DE)

( * ) Notice: Subject to any disclaimer, the term of this patent is extended or adjusted under 35 U.S.C. 154(b) by 0 days.

(21) Appl. No.: 18/987,174

(22) Filed: Dec. 19, 2024

(65) Prior Publication Data
US 2025/0209294 A1    Jun. 26, 2025

(30) Foreign Application Priority Data
Dec. 22, 2023   (DE) .......................... 102023136607.6

(51) Int. Cl.
*G06K 19/077*    (2006.01)

(52) U.S. Cl.
CPC .  *G06K 19/07773* (2013.01); *G06K 19/07758* (2013.01)

(58) Field of Classification Search
CPC ................ G06K 19/07773; G06K 19/07758
USPC ........................................................ 235/492
See application file for complete search history.

(56) References Cited

U.S. PATENT DOCUMENTS

| | | | |
|---|---|---|---|
| 11,254,035 B2 | 2/2022 | Guerry et al. | |
| 2009/0033495 A1 | 2/2009 | Abraham et al. | |
| 2010/0079286 A1* | 4/2010 | Phaneuf ........... | G06K 19/07749 340/572.1 |
| 2012/0056002 A1* | 3/2012 | Ritamaki ......... | G06K 19/07786 235/492 |
| 2013/0021215 A1 | 1/2013 | Suzuki et al. | |
| 2015/0027867 A1 | 1/2015 | Inotsuka | |
| 2015/0048170 A1* | 2/2015 | Forster ............... | G06K 19/0776 53/411 |
| 2016/0117585 A1* | 4/2016 | McDowell ........... | G06K 19/041 235/492 |
| 2017/0132505 A1* | 5/2017 | Yoshihara .............. | G06K 19/02 |

(Continued)

FOREIGN PATENT DOCUMENTS

DE   202007009169 U1   10/2007
DE   102006052516 A1   5/2008

(Continued)

OTHER PUBLICATIONS

German Office Action mailed Aug. 7, 2024 in connection with German Patent Application No. 102023136607.6, 5 pgs.

(Continued)

*Primary Examiner* — Allyson N Trail
(74) *Attorney, Agent, or Firm* — Chiesa Shahinian & Giantomasi PC

(57) ABSTRACT

The fixable labelling medium provides a carrier substrate and an RFID component with an antenna structure and a chip. The RFID component is configured to store information. The antenna structure is manufactured, for example, by means of an etching process. The fixable labelling medium can be fixed to an object.

11 Claims, 4 Drawing Sheets

(56) References Cited

U.S. PATENT DOCUMENTS

| | | | |
|---|---|---|---|
| 2019/0197380 A1* | 6/2019 | Blank | G06K 19/00 |
| 2021/0086493 A1* | 3/2021 | Sun | G06K 19/07749 |
| 2023/0175842 A1* | 6/2023 | Akinlemibola | G01B 7/004 |
| | | | 342/463 |
| 2023/0385592 A1* | 11/2023 | Bohn | B32B 37/0076 |
| 2024/0005122 A1* | 1/2024 | Nazarov | G01S 13/753 |
| 2024/0062373 A1* | 2/2024 | Pattje | G01N 35/00732 |
| 2024/0104333 A1* | 3/2024 | Suligoj | H01Q 9/28 |
| 2024/0220746 A1* | 7/2024 | Young | G06K 7/10158 |
| 2025/0124249 A1* | 4/2025 | Arao | H01Q 1/36 |

FOREIGN PATENT DOCUMENTS

| | | |
|---|---|---|
| DE | 202019102894 U1 | 6/2019 |
| EP | 1457301 A1 | 9/2004 |
| EP | 1912162 B1 | 4/2008 |
| EP | 2803479 A1 | 11/2014 |
| WO | 2023017538 A1 | 2/2023 |

OTHER PUBLICATIONS

Extended European Search Report mailed Apr. 28, 2025, in connection with European Patent Application No. 24221342.9, 10 pgs. (including transation).

* cited by examiner

V ⟷ R

FIXABLE LABELLING MEDIUM, METHOD FOR MANUFACTURING THE FIXABLE LABELLING MEDIUM, USE OF THE FIXABLE LABELLING MEDIUM AND SYSTEM CONSISTING OF A CASTING DEVICE/PATCH DEVICE AND THE FIXABLE LABELLING MEDIUM

CROSS-REFERENCE TO RELATED APPLICATIONS

This application claims priority from German Patent Application No. 102023136607.6, filed Dec. 22, 2023; the disclosure of which is incorporated herein by reference in its entirety.

BACKGROUND OF THE INVENTION

The invention relates to a fixable labelling medium that provides an RFID component. The labelling medium is suitable, for example, for an in-mould fixing process and/or a post-mould fixing process.

An in-mould fixing process is a casting process (e.g. injection moulding) for a cast object in which a medium is introduced into the cast object, attached to it or integrated into the cast object. For example, such a labelling medium can be a label that is attached to the outside of the plastic part during the manufacturing of a plastic part (e.g. a beverage crate). The special feature here is that the labelling medium is bonded to the plastic part by heating during the casting process. This means that the labelling medium is firmly attached to the cast object. Consequently, this fixing method is highly resistant to temperature fluctuations, moisture and mechanical stress.

A post-mould fixing process is a fixing process in which a labelling medium is fixed to an object by placing the labelling medium on the object and fixing, joining or fusing the labelling medium to the object using heat, for example by means of a laser device. This method also offers a high degree of resistance to temperature fluctuations, moisture and mechanical loads. The difference between the two fixing methods is that the labelling medium is fixed once while the object is being formed and once after the object has been formed.

Today, labelling media often include RFID components, which contain an antenna and a chip. To do this, material that forms an antenna is first printed on a mould substrate, for example a polyolefin, HDPE, PP material. Then, in a method known as pick and place, a chip is placed on the antenna structure and a contact is made. The labelling medium is then fixed to an object, with the RFID component located on the surface of the labelling medium that is exposed to an elevated temperature. Thereby, the surface with the RFID component is fixed to the object, with the RFID component being enclosed between the object and the mould substrate. In addition, the mould substrate can be printed with further information on the side opposite the RFID component.

However, the labelling medium and method described above have the following disadvantages. There is a risk that the chip or antenna structure will be damaged by the temperature load. Furthermore, the structure size for an antenna printing method is limited. In addition, the level of detail and accuracy of the antenna printing method are limited.

SUMMARY OF THE INVENTION

The object of the invention described here is to provide a fixable labelling medium that contains an RFID component, as well as a high level of detail and a high degree of accuracy of the electrical components, while at the same time providing reduced temperature sensitivity.

This object is solved by a fixable labelling medium with the features of claim 1, a method for manufacturing the fixable labelling medium with the features of claim 6, a method for manufacturing the fixable labelling medium with the features of claim 7, the use of the fixable labelling medium with the features the use of the fixable labelling medium with the features of claim 8, the use of the fixable labelling medium with the features of claim 9, the fixing system for fixing a fixable labelling medium with the features of claim 10 and the fixing system for fixing a fixable labelling medium with the features of claim 11. Further advantageous embodiments and further developments are the subject of the following claims.

The fixable labelling medium provides a carrier substrate and an RFID component with an antenna structure and a chip. The RFID component is configured to store information.

According to one aspect, the fixable labelling medium also comprises a mould substrate configured to bond to an object under the influence of heat. The RFID component is enclosed between the carrier substrate and the mould substrate.

According to one aspect, the antenna structure is manufactured by means of an etching process.

According to one aspect, the carrier substrate provides a printing surface and the RFID component is applied to the surface opposite the printing surface.

According to one aspect, the mould substrate is laminated to the carrier substrate with the RFID component.

A method of manufacturing the fixable labelling medium provides for a provision of the carrier substrate, a provision of the RFID component, a provision of the mould substrate, a fixing of the RFID component to the carrier substrate, and a laminating of the mould substrate to the carrier substrate and/or the RFID component.

A method for manufacturing the fixable labelling medium provides for a provision of the carrier substrate, a provision of the RFID component, a provision of the mould substrate, a fixing of the RFID component to the mould substrate, and a laminating of the mould substrate to the carrier substrate.

Use of the fixable labelling medium provides for a provision of the fixable labelling medium for a casting process and a casting of an object. In this process, the fixable labelling medium is provided in such a way that it is integrated into the object.

Use of the fixable labelling medium comprises a provision of the fixable labelling medium for a heat-fixing process, an application of the fixable labelling medium to an object and a heat treatment of the fixable labelling medium. The heat treatment is carried out in such a way that the fixable labelling medium bonds to the object.

A fixing system for fixing the fixable labelling medium to the object provides a casting device for casting the object and a holding unit for holding the fixable labelling medium. The holding unit holds the fixable labelling medium in such a way that the fixable labelling medium is integrated into the object.

A fixing system for fixing the fixable labelling medium to the object provides a holding unit for holding the fixable labelling medium on the object and a patch device for heating the fixable labelling medium and a surface of the object. This creates connections between the fixable labelling medium and the object.

DETAILED DESCRIPTION OF THE EMBODIMENTS

The embodiments with reference to the drawings are described below. It should be noted that the fixable labelling medium is referred to both as a 'fixable labelling medium' and as a 'labelling medium'.

First Embodiment

Figure 1:
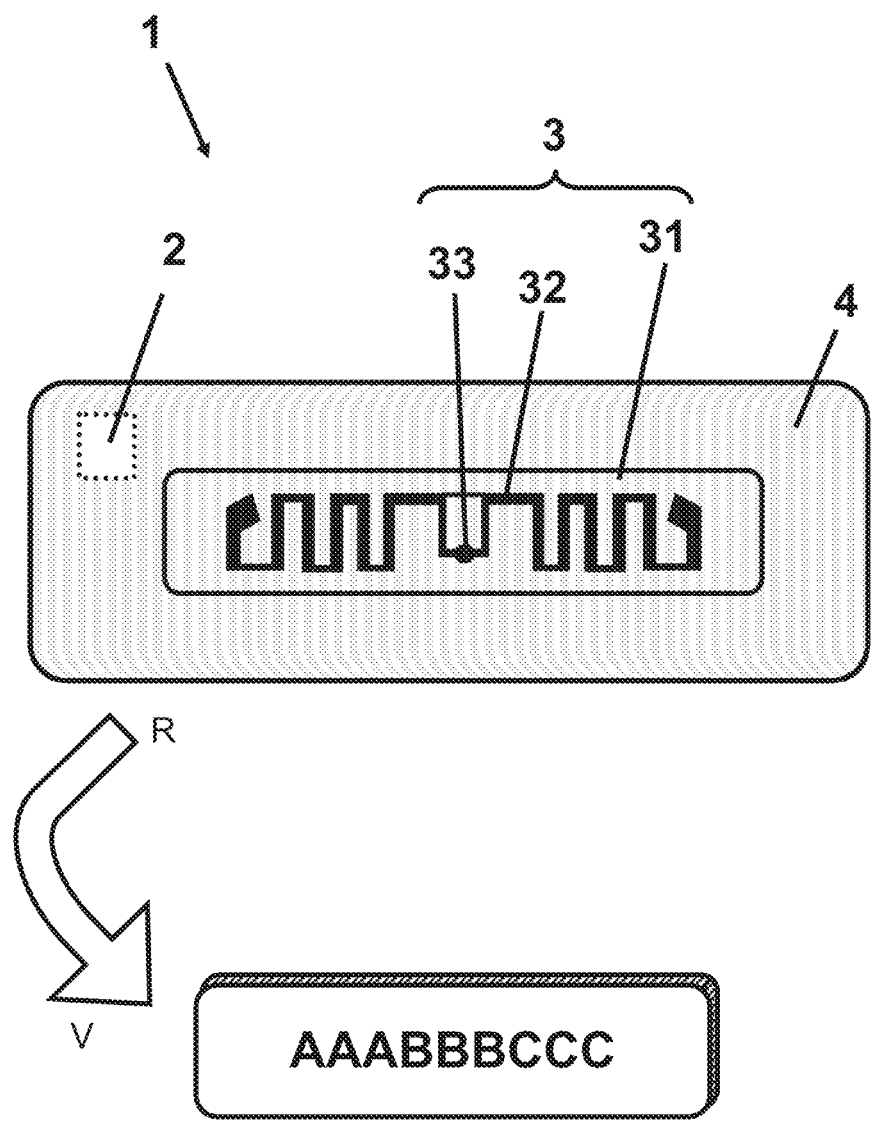
FIG. 1 shows a front side and a rear side of a fixable labelling medium according to a first embodiment.

As shown in FIG. 1, the fixable labelling medium 1 according to the first embodiment provides a carrier substrate 2, an RFID component 3 and a mould substrate 4, wherein the carrier substrate 2, the RFID component 3 and the mould substrate 4 are connected to one another and the RFID component 3 is arranged between the carrier substrate 2 and the mould substrate 4. In FIG. 1, a rear side R of the labelling medium 1 is shown in the manufactured state. The dashed rectangle in FIG. 1 shows the carrier substrate 2 located under the mould substrate 4. The RFID component 3 is visible through the mould substrate 4, which, according to the first embodiment, is transparent.

The carrier substrate 2 is, for example, a printable label material, film material, etc., which, in accordance with the first embodiment, is rectangular in shape. The carrier substrate 2 is printable on at least one side, as shown on the front side V of the labelling medium 1 in FIG. 1.

The RFID component 3 provides an adhesive film 31, an antenna structure 32 and a chip 33. The antenna structure 32 and the chip 33 are electrically connected to provide RFID functionality. The adhesive film 31 according to the first embodiment has an adhesive on one side over its entire surface, by means of which the antenna structure 32 adheres to the adhesive film 31. The RFID component 3 is fixed to the carrier substrate 2 by means of the adhesive film 31, with the RFID component 3 providing a smaller surface area than the carrier substrate 2.

Furthermore, the antenna structure 32 is manufactured using an etching process. This means that the antenna structure 32 is not printed on the carrier substrate 2, but is manufactured using the etching process and then applied to the adhesive film 31. The adhesive film 31 makes it easy to apply the antenna structure 32. The advantage of the etching process is that it achieves a high level of structural accuracy and allows more detailed and smaller structures. In addition, the etching process can achieve higher volumes in a shorter time than the antenna printing process.

The mould substrate 4 is applied or laminated to the carrier substrate 2 with the RFID component 3. According to the first embodiment, the RFID component 3 is completely enclosed between the carrier substrate 2 and the mould substrate 4, since the mould substrate 4 also provides a larger surface area than the RFID component. The mould substrate 4 is a material that bonds with another material, e.g. plastic, when heat is applied. According to the first embodiment, the mould substrate 4 can be made of polyolefin, PP, PE, HDPE, for example.

The labelling medium 1 provides the mould substrate 4 over the entire surface of the back side R by means of the structure described above. According to this embodiment, the laminated mould substrate 4 is permanently and firmly connected to the carrier substrate 2 and the RFID component 3. Since the mould substrate 4 is provided over the entire surface on the rear side R, a full-surface connection is obtained under the influence of heat between the fixable labelling medium 1 and an object 5 to which the labelling medium 1 is fixed.

Advantages

The fixable labelling medium 1 according to the first embodiment has several advantages.

The etched antenna structure 32 can ensure improved RFID functionality. In addition, the improved manufacturing method opens up further fields of application for the RFID component 3.

The adhesive film 31 of the RFID component 3 can be a material that does not bond with the object 5 to which the labelling medium 1 is to be fixed. A full-surface connection between the object 5 and the labelling medium 1 is created by the laminated mould substrate 4 when they are fixed together.

In addition, the adhesive film 31 and the mould substrate 4 provide a protective layer for the antenna structure 32 and the chip 33. When the labelling medium 1 is heated from a rear side R to bond with the object 5, the antenna structure 32 and the chip 33 are heated to a lesser extent because the adhesive film 31 and the mould substrate 4 are located between the heat source and the antenna structure 32 and the chip 33. The probability of damage to the RFID component 3 and a temperature sensitivity of the labelling medium 1 can thus be reduced.

Second Embodiment

A labelling medium 1 according to a second embodiment provides the same structure as the labelling medium 1 according to the first embodiment. Only the difference between the first and the second embodiment will be described in the following.

In the first embodiment, the RFID component 3 adheres to the carrier substrate 2. In contrast, the RFID component 3 of the second embodiment adheres to the mould substrate 4, that is, the adhesive of the adhesive film 31 faces the rear side R.

Furthermore, it is possible that the RFID component 3 is enclosed between the carrier substrate 2 and the mould substrate 4 with a separate adhesive or only in a form-fitting manner.

The fixable labelling medium 1 according to the second embodiment achieves the same advantages as the fixable labelling medium 1 according to the first embodiment.

Third Embodiment

A labelling medium 1 according to a third embodiment provides a different structure than the labelling medium 1 according to the first or second embodiment.

In contrast to the first and second embodiments, the labelling medium 1 of the third embodiment does not provide a mould substrate 4. That is, the RFID component 3 is fixed on the carrier substrate 2 and is exposed at the rear side R.

In this case, the carrier substrate 2 is a material which, like the mould substrate 4, bonds to an object 5 when heat is applied. Since the mould substrate 4 is not provided and the adhesive film 31 of the RFID component does not form a bond under the influence of heat according to this embodiment, no full-surface connection is created between the fixable labelling medium 1 and the object 5 during a fixing process. Nevertheless, the fixable labelling medium 1 according to the third embodiment can be fixed to the object 5.

In addition, advantages similar to those in the first and second embodiments can be achieved. For example, there is also a lower temperature sensitivity because the adhesive film 31 lies between the heat source and the antenna structure 32 and the chip 33. Furthermore, the antenna structure 32 according to the third embodiment is also manufactured using the etching method.

(Method)

Figure 2:
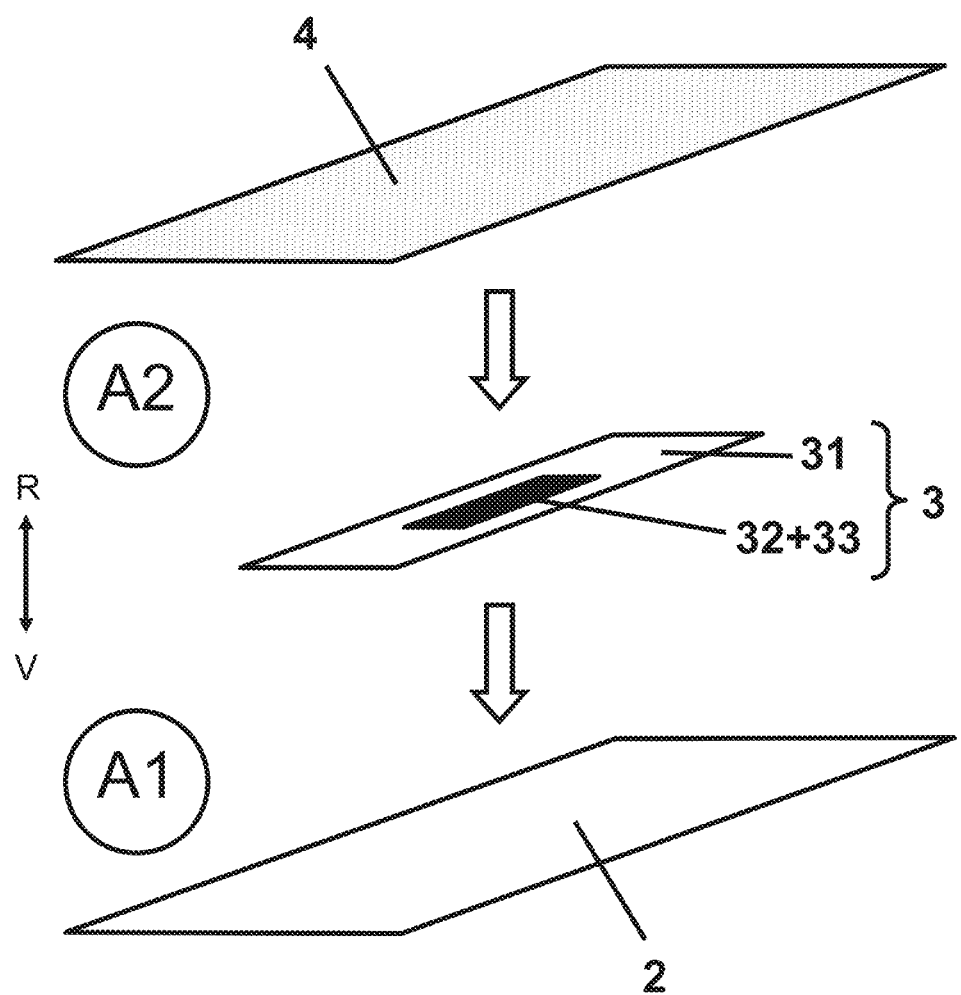
FIG. 2 shows a manufacturing method for a fixable labelling medium.

The fixable labelling medium 1 is manufactured as shown in FIG. 2.

First, the carrier substrate 2 is provided. The RFID component 3 is applied to the carrier substrate 2, whereby the RFID component 3 is fixed to the carrier substrate 2 by means of the adhesive film 31. The RFID component 3 provides a smaller surface area than the carrier substrate 2. The RFID component 3 can be aligned essentially in the centre with respect to the carrier substrate 2 during application. However, the application position can be freely selected depending on the application. This step corresponds to step A1.

Step A1 is followed by step A2, in which the mould substrate 4 is laminated onto the carrier substrate 2 with the RFID component 3. To do this, an adhesive is applied over the entire surface of the rear side of the carrier substrate 2 with the RFID component 3, and then the mould substrate 4 is placed over the entire surface of the rear side R. The adhesive bonds the components permanently and firmly together. This process is known as laminating the mould substrate 4.

In accordance with the embodiments described above, the mould substrate 4 is transparent. This makes it possible to use a UV adhesive as an adhesive for laminating. Once the adhesive has cured, the mould substrate 4 is permanently fixed to the carrier substrate 2 with the RFID component 3.

The method described is used to manufacture the fixable labelling medium 1 according to the first embodiment. The method can be adapted accordingly to manufacture the fixable labelling media 1 according to the second and third embodiments.

Furthermore, it is possible to fix a plurality of RFID components 3 on a carrier substrate 2 and to laminate the mould substrate 4, subsequently. Subsequently, either a fixable labelling medium 1 is produced, which provides a plurality of RFID components 3, or punching, cutting, perforating, etc. can be carried out to create a plurality of individual fixable labelling media 1.

(Utilization-In-Mould)

The fixable labelling medium 1 can be used for an in-mould and/or post-mould method, depending on the materials used.

Figure 3:
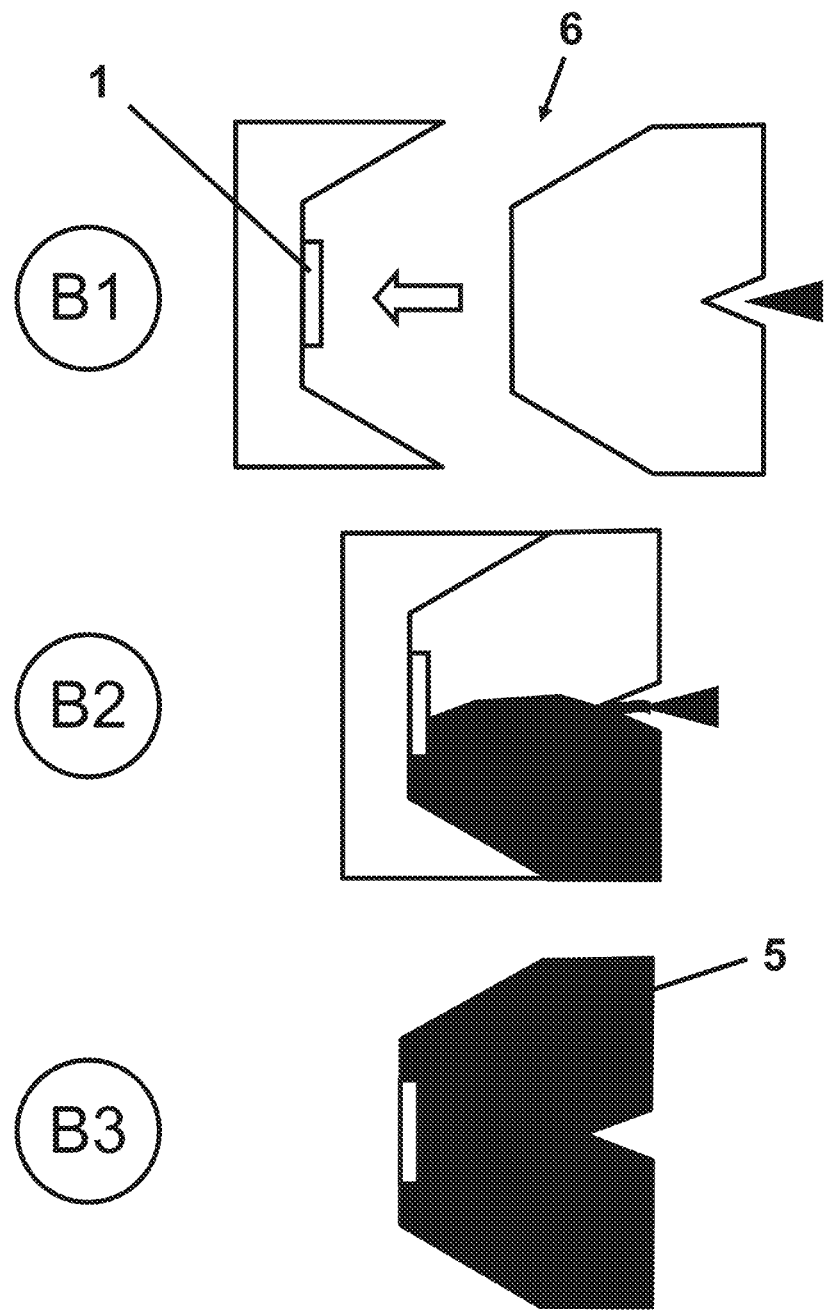
FIG. 3 shows a use of the fixable labelling medium in a casting method.

In the in-mould method, the fixable labelling medium 1 is bonded to an object 5 or integrated therein during a casting process. FIG. 3 shows an example of an injection moulding process.

In step B1, the labelling medium 1 is inserted or placed in a casting device 6 and held in a predetermined position. In this case, the rear side R of the labelling medium 1 points towards the interior of the casting device 6. The printed front side V of the labelling medium 1 points away from the interior of the casting device 6 and is in contact with the inner wall of the casting device 6.

In step B2, the casting device is closed and an injection of, for example, a liquid plastic takes place. This fills the interior of the casting device 6 to form the object 5. In the process, the liquid and heated plastic comes into contact with the labelling medium 1. The heat causes the liquid plastic, which forms the object 5, and the mould substrate 4 of the labelling medium 1 to bond. In this process, vulcanization can take place between the materials, causing them to permanently bond with each other at the surfaces.

In step B3, the solidified object 5 is removed from the casting device 6. The labelling medium 1 is permanently fixed to the object 5. The front side V of the labelling medium 1 is exposed on the outside. This means that the printed surface of the labelling medium 1 is visible.

However, it is also possible to completely cast the labelling medium 1 into the object 5. This requires either a transparent casting material or a labelling medium 1 that is not printed or at least does not have any printing that will be needed later.

It should be mentioned again that the RFID component 3 is protected from thermal stress during casting because the mould substrate 4 comes into direct contact with the liquid plastic, but not the RFID component 3.

Together, the casting device 6 and the fixable labelling medium 1 form a fixing system for fixing the fixable labelling medium 1 to the object 5.

(Use-Post-Mould)

Figure 4:
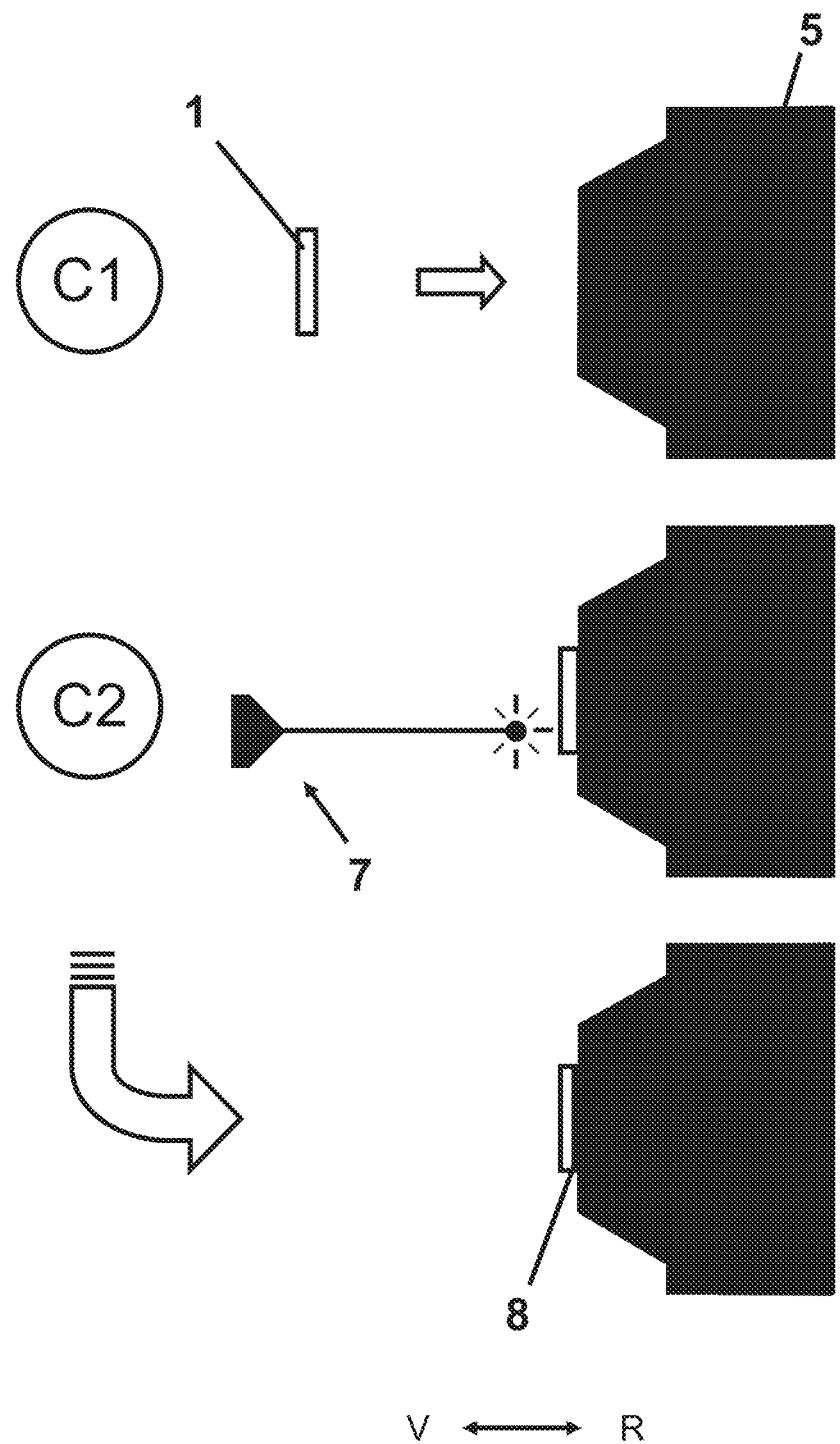
FIG. 4 shows a use of the fixable labelling medium in a patch method.

The post-mould method differs from the in-mould method in that the labelling medium 1 is not fixed during the moulding process but after it. Nevertheless, the post-mould method is also based on a heat-fixing principle. The post-mould method is illustrated in FIG. 4.

In step C1 of the post-mould method, the fixable labelling medium 1 and the object 5 are provided. The labelling medium 1 is placed or held on the object 5 at a predetermined position. In this case, the front side V of the labelling medium 1 points away from the object 5, with the rear side R of the labelling medium 1 facing the object.

In step C2, for example, a patch device 7 is provided. The patch device 7 can be a laser, for example. The laser can be used to irradiate specific positions or areas of the labelling medium 1 located on the object 5. This is hereinafter referred to as 'patching'. This causes the mould substrate 4, which in this case can be a sealable film, to heat up on the rear side R of the labelling medium 1 as well. The surface of the object 5 is also heated at the irradiated points. At the points heated in this way, a junction 8 is formed, at which the mould substrate 4 and the object 5 are permanently connected. The laser can, for example, be applied in an all-around or circulating manner, so that a junction 8 results or is formed all around the labelling medium 1.

After step C2, the fixable labelling medium 1 is permanently connected to the object 5 by the junction 8 or the plurality of junctions 8.

It should be mentioned that the RFID component 3 is protected from thermal stress during the patching process because the mould substrate 4, but not the RFID component 3, comes into direct contact with the heated surface of the object 5.

Together, the patch device 7 and the fixable labelling medium 1 form a fixing system for fixing the fixable labelling medium 1 to the object 5. The patch device 7 can be a suitable device that can generate punctual or surface heating on the outside of the labelling medium 1 and the object. This means that the patch device 7 is not necessarily a laser.

Modifications

In accordance with the previously described embodiments, a carrier substrate 2 and a mould substrate 4 are provided. Although different terms are used for the carrier substrate 2 and the mould substrate 4, both can be made of the same material.

The fixable labelling medium 1 was described as rectangular. However, the shape of the fixable labelling medium 1 can be any shape.

Furthermore, the carrier substrate 2 was described as printable. The carrier substrate 2 does not necessarily have to be printable and can provide two non-printable surfaces.

The carrier substrate 2, the RFID component 3 and the mould substrate 4 were described as permanently connected to each other. This is advantageous if a permanent labelling on the object 5 is to be achieved by the fixable labelling medium 1. However, it is possible to adjust the stability and strength of the connection in a suitable manner and thus also to set a connection that is not permanent. Similarly, a connection surface or the junctions between the object 5 and the labelling medium 1 can be suitably set.

Furthermore, the mould substrate 4 was described as being applied over the entire surface. The mould substrate 4 can be provided with a suitable shape and does not necessarily have to be applied over the entire surface. For example, the mould substrate 4 can be applied only to the adhesive film 31. Furthermore, as described in the third embodiment, the mould substrate 4 can be omitted.

LIST OF REFERENCE SIGNS

1 Labelling medium
2 Carrier substrate
3 RFID component
31 Adhesive film
32 Antenna structure
33 Chip
4 Mould substrate
5 Object
6 Casting device
7 Patch device
8 Junction
V Front side
R Rear side

The invention claimed is:

1. A fixable labelling medium, comprising:
a carrier substrate,
a mould substrate configured to bond to an object under heat application,
an Radio Frequency Identification (RFID) component having at least one antenna structure and a chip, wherein
the RFID component is configured to store information,
the RFID component comprises an adhesive film to which at least the antenna adheres,
the RFID component is fixed to the carrier substrate by means of the adhesive film, and
the mould substrate is provided at least over the entire surface of the RFID component.

2. The fixable labelling medium according to claim 1, wherein
the RFID component is enclosed between the carrier substrate and the mould substrate.

3. The fixable labelling medium according to claim 1, the antenna structure being manufactured by means of an etching process.

4. The fixable labelling medium according to claim 1, wherein
the carrier substrate comprises a printing surface and the RFID component is applied to the surface opposite the printing surface.

5. The fixable labelling medium according to claim 1, wherein
a mould substrate is laminated onto the carrier substrate with the RFID component.

6. A method for manufacturing a fixable labelling medium according to claim 1, the method comprising:
providing of a carrier substrate,
providing of an RFID component,
providing of a mould substrate,
fixing the RFID component on the carrier substrate, and
laminating the mould substrate onto the carrier substrate and/or the RFID component.

7. A method for manufacturing a fixable labelling medium according to claim 1, the method comprising:
providing of a carrier substrate,
providing of an RFID component,
providing of a mould substrate,
fixing the RFID component to the mould substrate, and
laminating the mould substrate to the carrier substrate.

8. Use of a fixable labelling medium according to claim 1, comprising:
providing of the fixable labelling medium for a casting process,
casting of an object, wherein
the fixable labelling medium is provided in such a way that it is integrated in the object.

9. Use of a fixable labelling medium according to claim 1, comprising:
providing of the fixable labelling medium for a heat-fixing process,
applying the fixable labelling medium to an object,
heat-treating the fixable labelling medium in such a way that the fixable labelling medium bonds to the object.

10. A fixing system for fixing a fixable labelling medium according to claim 1 to an object, the system comprising:
a casting device for casting the object,
a holding unit for holding the fixable labelling medium,
the holding unit holds the fixable labelling medium in such a way that the fixable
labelling medium is integrated into the object when the object is cast.

11. A fixing system for fixing a fixable labelling medium according to claim 1 on an object, the system comprising:
a holding unit for holding the fixable labelling medium on the object,
a patch device for heating the fixable labelling medium and a surface of the object so that junctions are formed between the fixable labelling medium and the object.

* * * * *